United States Patent [19]

Gallo

[11] 4,211,295
[45] Jul. 8, 1980

[54] METHOD AND A SCALE FOR MANUAL OR AUTOMATIC WEIGHING OF OBJECTS OF SAME NOMINAL WEIGHT

[75] Inventor: Mario Gallo, Zurich, Switzerland
[73] Assignee: Wirth, Gallo & Co., Zurich, Switzerland
[21] Appl. No.: 923,377
[22] Filed: Jul. 10, 1978

[30] Foreign Application Priority Data

Jul. 28, 1977 [CH] Switzerland .................. 009331/77

[51] Int. Cl.$^2$ .................. G01G 23/10; G01G 7/00
[52] U.S. Cl. .................. 177/185; 177/212
[58] Field of Search .................. 177/50, 154, 185, 1, 177/210 FP, 210 EM, 212

[56] References Cited

U.S. PATENT DOCUMENTS

| | | | |
|---|---|---|---|
| 3,621,713 | 11/1971 | Wirth et al. | 177/210 FP X |
| 3,802,522 | 4/1974 | Thompson et al. | 177/185 X |
| 3,885,427 | 5/1975 | Melcher et al. | 177/210 FP X |
| 4,043,190 | 8/1977 | Gallo | 177/210 FP X |
| 4,088,014 | 5/1978 | Wirth et al. | 177/210 FP X |

*Primary Examiner*—George H. Miller, Jr.
*Attorney, Agent, or Firm*—Stevens, Davis, Miller & Mosher

[57] ABSTRACT

Method and scale are designed for the manual or automatic weighing of objects of the same nominal weight by means of a scale locked over its measuring system, having a computing device for establishing the weight of the goods to be weighed from the digital output signals of mechanical-electrical converters, e.g. from pre-tensioned measuring strings loaded by the weight of said goods, in which if the load on the measuring system is lower or higher than predetermined limits of the load corresponding to said nominal weight, an electromagnetically generated force acts upon the load support of the scale and prevents the overshooting of said predetermined load limits.

5 Claims, 6 Drawing Figures

METHOD AND A SCALE FOR MANUAL OR AUTOMATIC WEIGHING OF OBJECTS OF SAME NOMINAL WEIGHT

The invention relates to a method and an apparatus for manual or automatic weighing of objects of the same nominal weight by means of a scale locked over its measuring system, having a computing device for establishing the weight of the goods to be weighed from the digital output signals of mechanical-electrical converters, e.g. from pre-tensioned measuring strings loaded by the weight of said goods.

Such methods are known which take advantage of the fact that in scales of this type the results of the weighing operations are delivered in digital form.

Scales with which such methods are used have in their measuring system two mechanical-electrical converters such as strain gauges, vibrating quartz, vibrating rods or strings. In order to enhance the accuracy and the simplicity of the computation of the measurement, the output of the strain gauges are often transformed into a signal having a frequency, so that generally speaking the term vibrator can be used for all these converters. One of them is used as generator for providing a reference frequency, the other as a generator for providing the measuring frequency. It is irrelevant whether the reference frequency is constant or variable under the action of the weight of the goods to be weighed.

The actual weight of the goods or objects to be weighed may generally diverge within pre-set limits from a nominal weight, so that known electronic comparators are used to check whether or not the minimum and maximum limits are exceeded. The signals from these comparators indicating te exceeding of the limits control a display and/or their devices so as to allow withdrawal of an object with too low or too large a weight.

Scales which are locked over their measuring system are particularly suitable for such methods because the displacement of their load support or platform is generally very small. However, for each weighing operation the scale must be relieved and loaded again. If overlapping weighing is applied, i.e. if two objects to be weighed are simultaneously on the platform, at least for a short time, then the scale is relieved and loaded with respect to the nominal weight but not to its unloaded state. In order to judge the effect of this situation, it must be recalled that scales locked over their measuring system have a certain resilience, they contain high viscosity absorbers such that the measuring force corresponding to the weight of the goods to be weighed acts upon the measuring system only in an exponentially damped way. Furthermore, scales establishing the weight of goods in a digital form can generally interpret a force as the measure of a weight only if two consecutive weighings differ by a pre-determined quantity (so-called immobility check). As a consequence any relevant variation of load require an additional waiting time before the result can be computed.

It is an object of the invention to provide a method for weighing objects of the same selectable nominal weight, which is suitable for manual and automatic weighing at a high rate and which allows a substantial reduction in waiting time periods.

The method according to the invention is characterized in that if the load on the measuring system is lower or higher than pre-determined limits of the load corresponding to said nominal weight, an electro-magnetically generated force acts upon the load support of the scale and prevents overshooting of said pre-determined load limits.

It is another object of the invention to provide a scale suitable for carrying out the method according to the invention. Such a scale is characterized by a mixer for forming the difference frequency from a measuring frequency and a reference frequency, by at least one control frequency generator generting a control frequency proportional to the reference frequency, at least one circuit with an RS-flip-flop and a first amplifier forming a true difference integrator, said RS-flip-flop being controlled by said control frequency and said difference frequency, the latter being also directly fed to said first amplifier, by at least one current amplifier for amplifying one of the output signals of said first amplifier, by an electromagnet with at least one winding and an armature fixed to the load support of the scale, said windings being connected to the output of said second amplifier and fed by it.

Embodiments of the scale according to the invention are represented schematically in the enclosed drawings. The method according to the invention will be described by way of examples referring to these embodiments.

Figure 1:
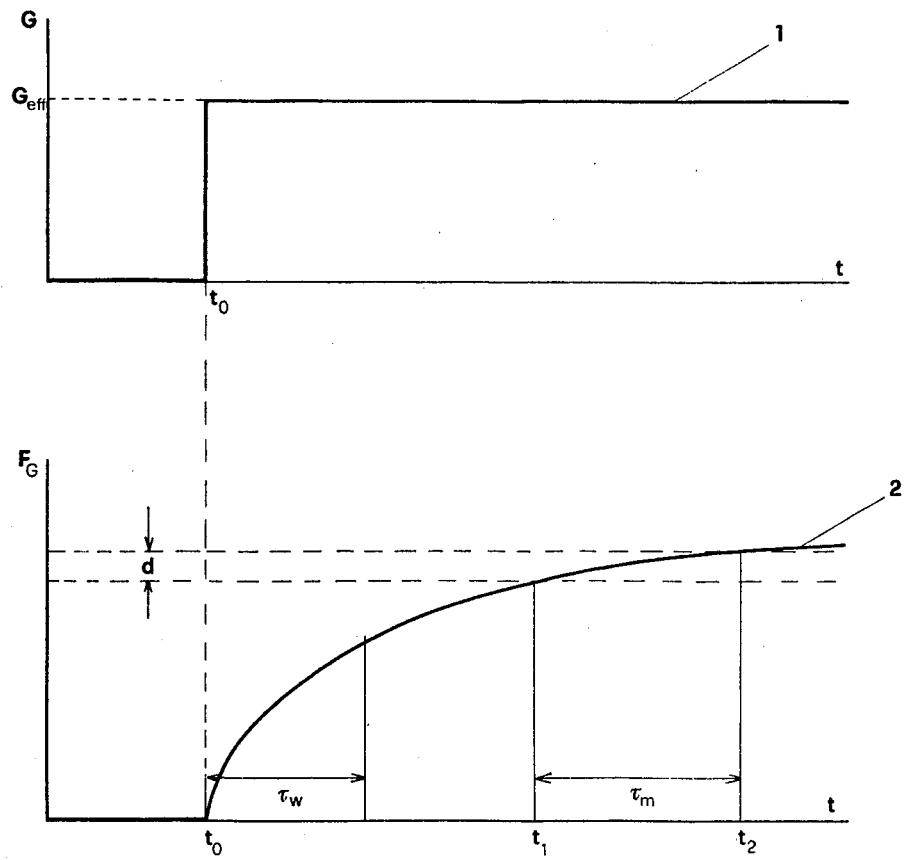
FIG. 1 shows a time-force diagram for the measuring system.

FIG. 1 shows schematically the variations of the measuring force as a function of time when a mass to be weighed is put on the platform of the scale. The measuring force is the force which acts on the measuring cell and which is proportional to the weight of the mass to be measured. Curve 1 shows how the weight on the platform (of a scale not shown) develops as a step function. A curve 2 shows how the force acting on the measuring cell develops. The latter is a mechanical-electrical converter, the frequency of which varies as a function of the measuring force, for instance a vibrating quartz, a measuring string, in case of a two-string scale the system comprising the two strings and their force distributor, or a strain gauge. The measuring force $F_G$ is shown on the G-axis and time on the t-axis. If $t_o$ is the time at which the mass to be measured is put on the platform, the measuring force $F_G$ develops according to the well known function:

$$F_G(t) = F_e(1 - e^{-t/\tau w})$$

where:
$F_G(t)$ is the time-depending measuring force,
$F_e$ is the value of the measuring force after some time which corresponds to the weight $G_{eff}$ of the mass to be measured,
$\tau w$ is the time constant of the load transmission channel of the scale.

In FIG. 1 d indicates the force difference which corresponds to the finest measuring unit of the scale, i.e. to the resolution of the scale. If $\tau w$ is the time constant of the scale, that is the time during which the vibrations of the measuring element are counted, then $t_1$ is the first point in time at which a measurement can start which could be displayed, as the value of the measuring force averaged during $\tau_m$ differs from the averaged value during the next $\tau_m$ period only by d.

Figure 2:
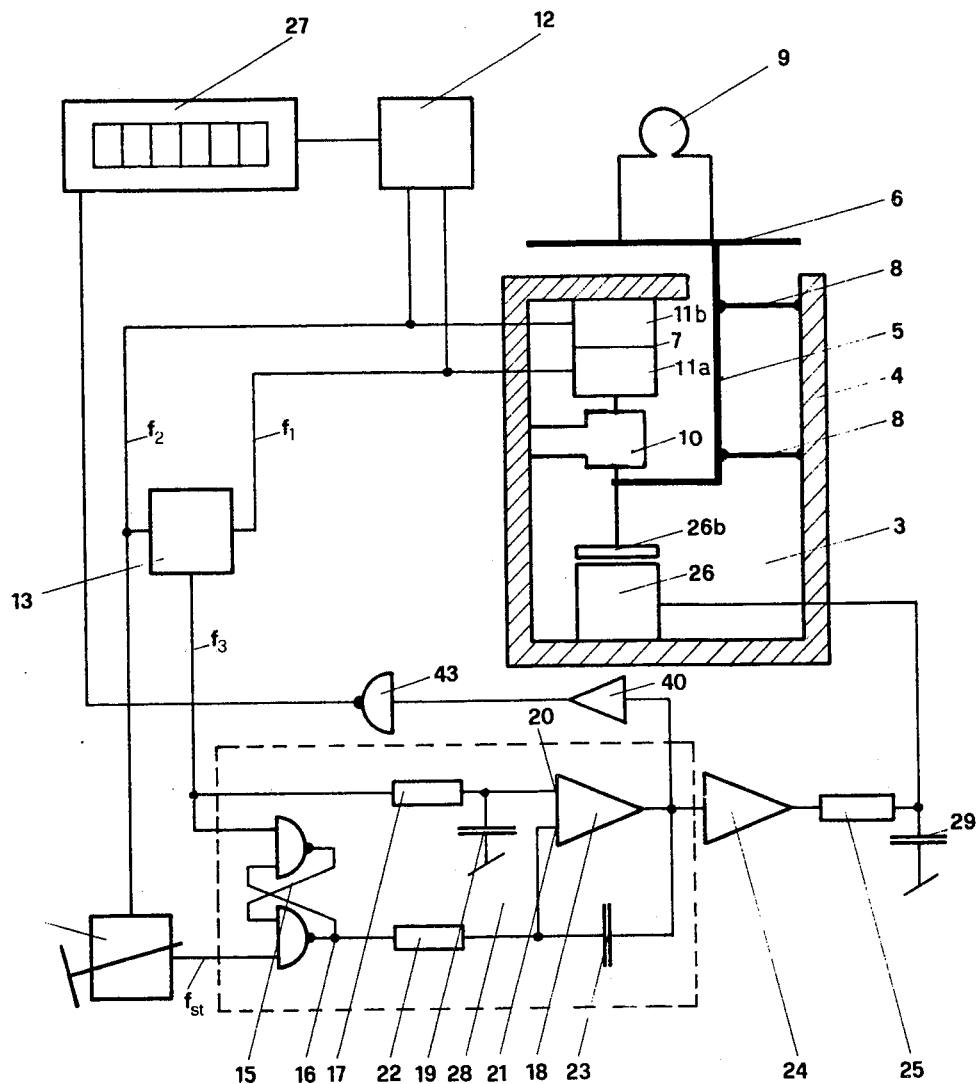
FIG. 2 shows a first embodiment of the scale.

A first embodiment of a scale is shown schematically in FIG. 2. Scale 3, a two-string scale of well known construction, has a body 4, a load support 5 with platform 6 and a measuring cell 7 in which the two vibrating strings (not shown) are mounted. Load support 5 is fixed to body 4 by means of two guides 8. Cell 7 is fixed to body 4 and is submitted over a transmission channel 10 to the measuring force which corresponds to the weight of a mass 9. In cell 7 there are two oscillators 11a, 11b which transmit the measuring frequency $f_1$ and the reference frequency $f_2$, i.e. the frequencies of the two vibrating strings, as a series of square pulses to a computing device 12 and to a mixer 13 forming the difference $f_3 = f_1 - f_2$. In a well known construction of the two-string scale $f_1 > f_2$.

The reference frequency $f_2$ is also transmitted to a control frequency generator 14 which generates a frequency $$f_{st} = n f_2$$

where n is an adjustable factor. Signals of frequency $f_3$ and $f_{st}$ are transmitted to an RS-flip-flop 15 the output of which changes its signal level when the square pulses of frequencies $f_3$ and $f_{st}$ arrive alternatively, but does not change if two consecutive impulses are received on the same line without receiving, during the same time period, a pulse on the other line. The signal of frequency $f_3$ is transmitted through a resistor 17 to the inverting input 20 of an amplifier 18 which is grounded through a condenser 19. The non-inverting input 21 of amplifier 19 receives the output signal of RS-flip-flop 15 through resistor 22. The output signal of amplifier 18 is fed back to input 21 through a condenser 23. Resistors 17, 22 and condensers 19, 23 are such that the two resulting time constants are the same and they are long compared with the period of frequency $f_3$. The output signal of amplifier 18 is amplified by means of a current amplifier 24 and feeds an electromagnet 26 through a resistor 25. This electromagnet 26 acts upon a permanent magnet armature 26b so as to attract it when it receives a current from amplifier 24. Armature 26b is fixed to load support 5 exactly at the point where the measuring force acts upon measuring cell 7.

This circuitry functions as follows: the measurement R from the weighing operation is formed within the computing device 12 from both frequencies $f_1$, $f_2$ by using the well known formula:

$$R = c (f_1 - f_2/f_2)$$

and is then displayed by display 27. If the weighing operation consists in weighing in series objects of the same nominal weight, it is desirable, in order to accelerate the operation of the scale, to avoid the scale behavior as described in relation to FIG. 1 each time a new object is laid on platform 6. Therefore load support 5 is pulled downwards by electromagnet 26 if the value of measuring force $F_G$ (see FIG. 1) is below a pre-selected minimum. The latter can be adjusted by means of control frequency generator 14. The whole circuit 28, consisting of RS-flip-flop 15, resistors 17, 22, condensers 19, 23 and amplifier 18, is a true integrator of the differences of the input signals. If platform 6 is empty or insufficiently loaded, $f_3 < f_{st}$ and the value of the input signal of amplifier 18 changes stepwise along oblique lines, is amplified in current amplifier 24 and controls the current fed to electromagnet 26. the latter acts indirectly by means of its armature 26b—which augments the measuring force acting upon measuring cell 7—upon frequencies $f_1$, $f_2$ so that their difference $f_1 - f_2$ increases until $$f_3 = f_1 - f_2 = f_{st}$$

Because $f_{st} = n f_2$, when this stage is reached:

$$f_1 - f_2 = n f_2$$

or $$(f_1 - f_2/f_2) = n$$

so that n is proportional to the pre-selected minimum value $G_{min}$. A condenser 29 together with resistor 25 ensures that the variations of currents for the electromagnet 26 are transmitted to it with the time constant of the combination condenser 29/resistor 25, so as to prevent the vibrations stemming from the environment of scale 3 and transmitted to its body 4 or to platform 6 (for instance due to vibrations of the ground or of a feeder device, not represented here) are transmitted to electromagnet 26.

Amplifier 18 feeds also another amplifier 40, the output voltage of which is transmitted to an inverter 43. The output signal from this inverter 43, a logical ONE or a logical ZERO, is fed to display 27. A ONE is transmitted only if amplifier 18 does not generate an output signal so that electromagnet 26 is not activated. This is the case only if a weight $G > G_{min}$ is loaded on platform 6. The ONE signal of inverter 43 allows the computed value of the mass to be weighed to be displayed and further processed.

In a known two-string scale $f_2$ decreases with increasing load. In other known two-string scales $f_2$ is constant. In some one-string scales the reference frequency $f_2$ is generated by a vibrating quartz and is constant. Also measuring frequency $f_1$ could be generated by a quartz with variable frequency, and one or both frequencies could be generated by strain gauges the outputs of which are transformed into frequencies.

Figure 3:
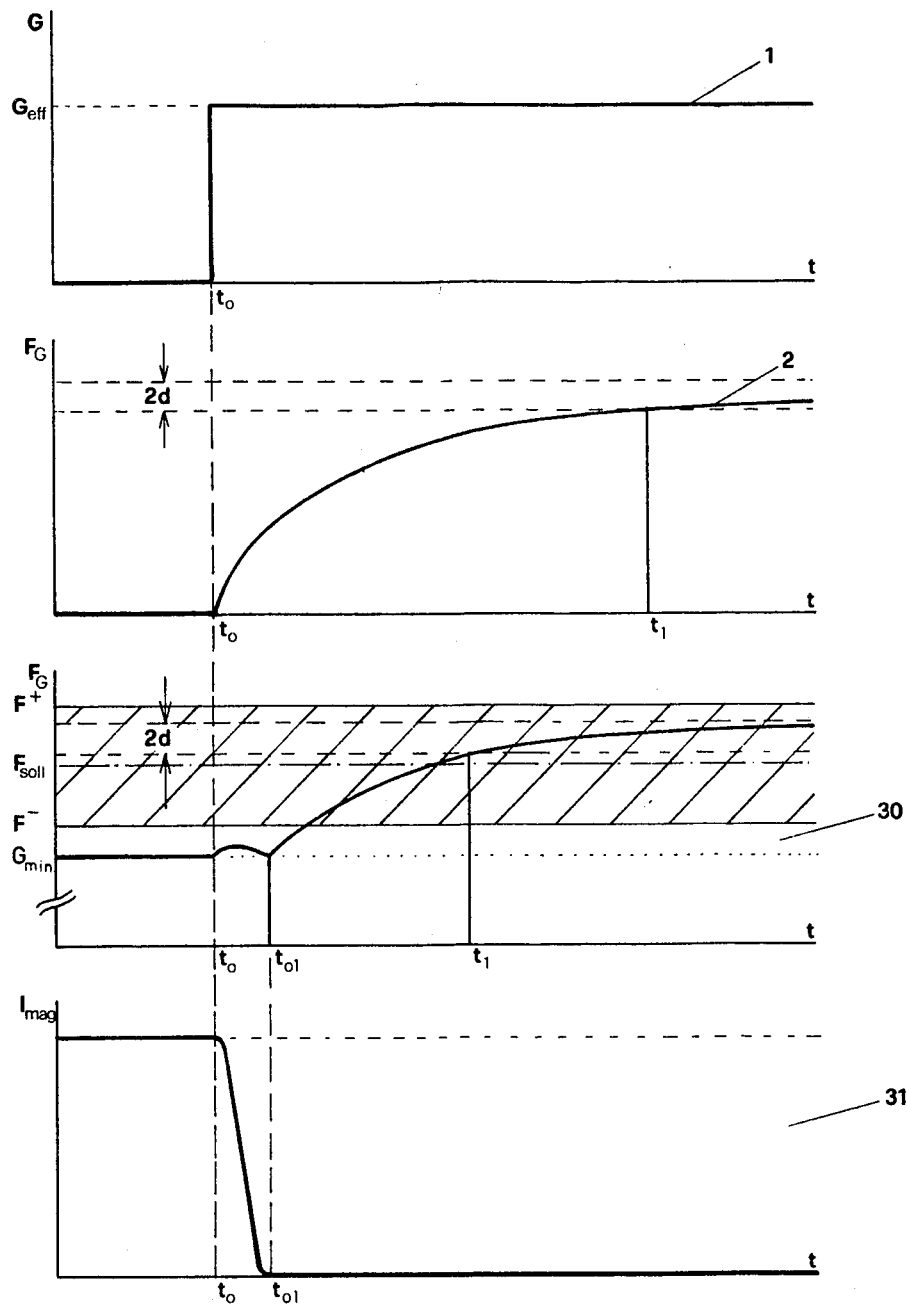
FIG. 3 shows a time-force and time-current diagram for the scale according to FIG. 2 when it is loaded, FIG. 4 the corresponding diagram when the scale is relieved, FIG. 5 a second embodiment of the scale and FIG. 6 the corresponding time-force and time-current diagram.

FIG. 3 shows the development of a weighing operation with a scale according to FIG. 2. Curves 1 and 2 of FIG. 1 have been added for the ease of comparison. Diagram 30 shows the time-dependent value of the measuring force acting upon cell 7. Up to time $t_o$ no mass rests on platform 6. Electromagnet 26 pulls load support 5 with a force corresponding to a measuring force $F_{Gmin}$ for cell 7. This force $F_{Gmin}$ corresponds either to weight $G_{min}$ as set for control oscillator 14 or is proportional to it. At time $t_o$ a mass of weight $G_{eff}$ is laid on platform 6. Because of the time constant $\tau_R$ of the circuit consisting of mixer 13, circuit 28, amplifier 24, resistor 25 and condenser 27, force $F_G$ increases for a short time. In diagram 31 the control current $I_{mag}$ for electromagnet 26 is represented in function of time. At time $t_o$—when the mass with weight $G_{eff}$ is put on platform 6—control current $I_{mag}$ begins to decrease and becomes zero after a time $t_{01} - t_0$. Then force $F_G$ begins to increase starting from level $F_{Gmin}$. It first reaches a value F⁻ corresponding to the acceptable minimum weight of the mass to be weighed, then exceeds—in this example —value $F_{soll}$, i.e. the value of $F_G$ corresponding to the desired nominal weight $G_{soll}$ and finally, at time $t_1$, reaches a band of width 2d. In this band a weighing operation satisfies the condition that two consecutive weighings may not differ by more than d. Value F⁺ corresponds to the acceptable maximum value of the weight.

When $f_3 > F_{st}$ the force of electromagnet 26 decreases and if this condition is maintained, this force becomes zero. However, then no sign change of $I_{mag}$ is possible because the circuitry described with RS-flip-flop 15 and amplifier 18 is asymmetrical.

Figure 4:
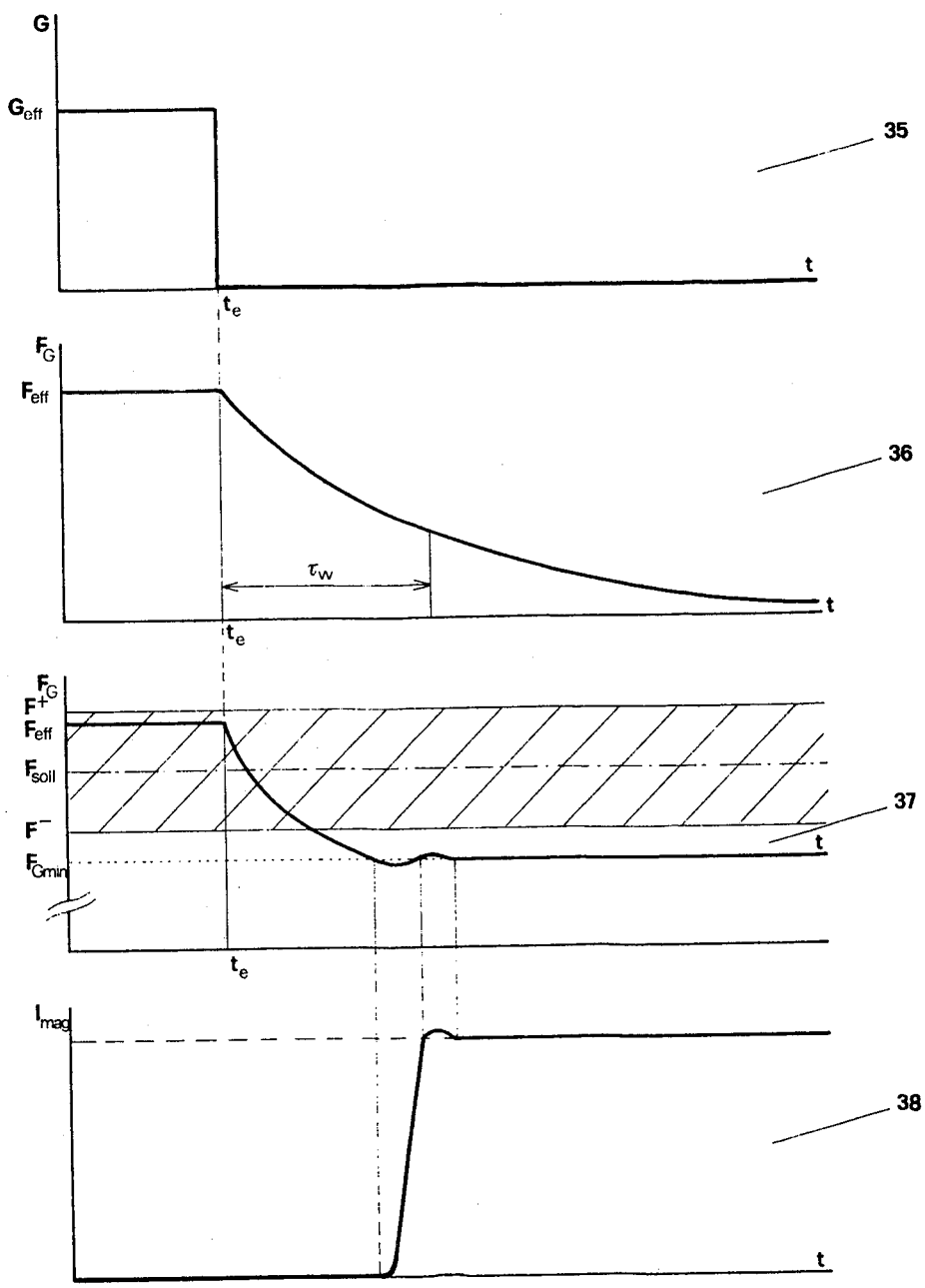

FIG. 4 shows the behaviour of scale 3 and of the circuitry described when the mass to be weighed is taken off platform 6. Diagram 35 shows the weight acting upon platform 6. At time $t_e$ mass 9 is taken off. Diagram 36 shows the behaviour of the scale without electromagnet 26 and its control circuitry. Force $F_G$ diminishes exponentially according to:

$$F_G(t) = F_{eff} e^{-t/\tau w}$$

Diagram 37 shows the variation of the measuring force acting upon cell 7 in FIG. 2. At time $t_e$ force $F_G$ diminishes from value $F_{eff}$ down to value $F_{Gmin}$ according to the above mentioned exponential function. Then circuitry 28 according to FIG. 2 reacts and control current $I_{mag}$ starts to grow until a force $F_{Gmin}$ is exerted on cell 7 by electromagnet 26 in spite of platform 6 being empty. The undershoot of force $F_G$ under the value $F_{Gmin}$ is again a consequence of the time constant of the whole control circuitry, also the following overshoot corresponds to an overshoot of control current $I_{max}$ as shown in diagram 38. The control current is no longer equal to zero when $F_G < F_{Gmin}$.

Figure 5:
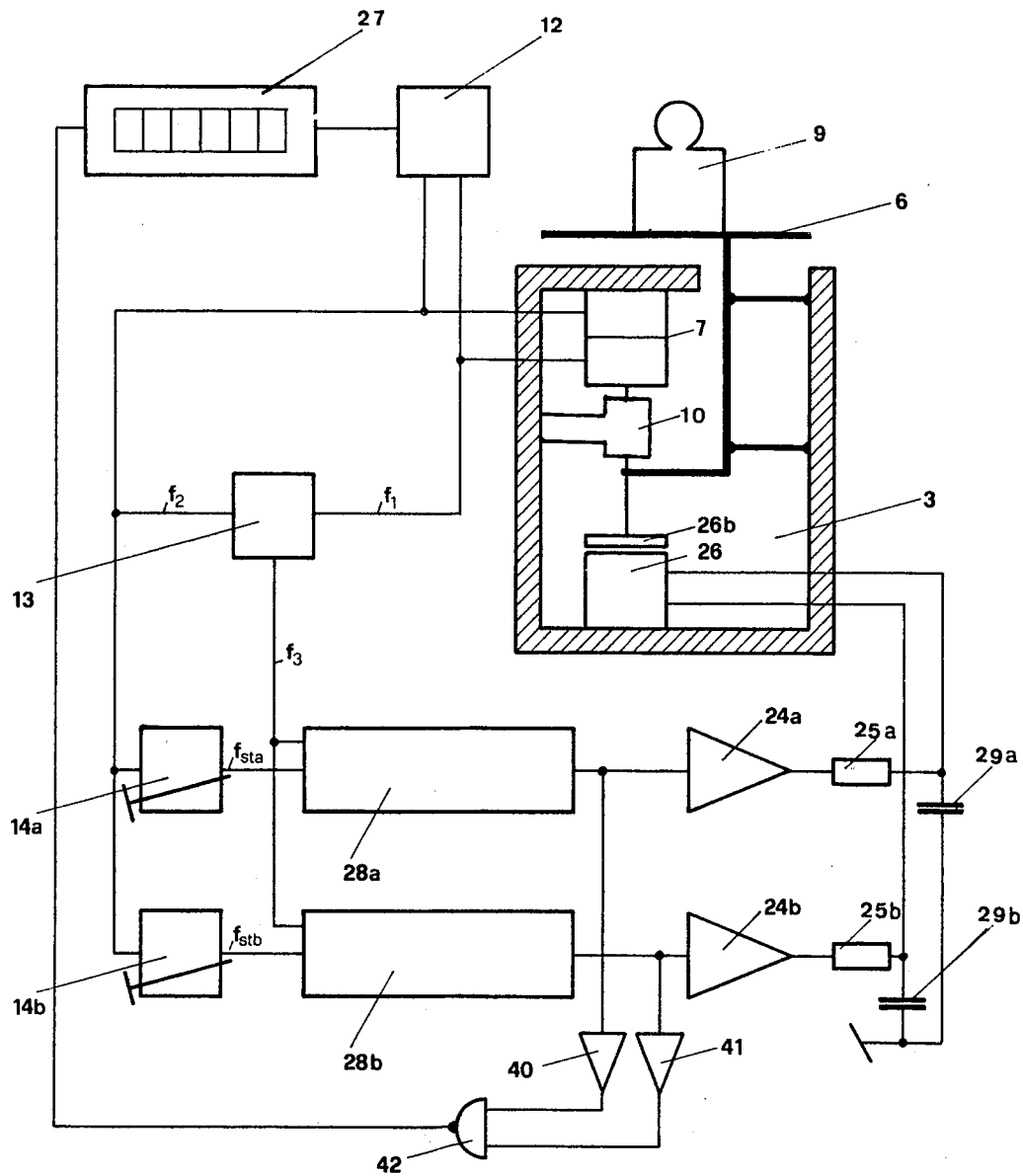

In FIG. 5 another embodiment is shown. Scale 3 corresponds to that of FIG. 2. It has a mixer 13 the output of which feeds two identical circuitries 28a, 28b which each corresponds to that shown in FIG. 2. Only the polarity of the inputs of amplifier 18 is reversed. The control frequency generator 14 according to FIG. 2 is replaced by two identical such generators 14a, 14b. Electromagnet 26 has two windings being fed by current amplifiers 24a and 24b respectively. These amplifiers 24a, 24b correspond to amplifier 24 of FIG. 2. In the embodiment according to FIG. 2 electromagnet 26 could only exert an additional tensile force, electromagnet 26 of FIG. 5 with its two windings each fed by separate circuits 28a, 28b respectively can exert tensile and pressure forces. This can be achieved for instance by inverting the winding sense of both windings.

The embodiment according to FIG. 5 has, compared with that of FIG. 2, the additional task of preventing cell 7 from being loaded with a force greater than a pre-determined value $F_{Gmax}$. This is an operational condition which can happen depending on the dynamic properties of the scale in particular when it is relieved. This embodiment allows for serial loading of the scale such that platform 6 can be loaded by the object just weighed and be further loaded by the next object to be weighed making overlapping weighing operations possible. In order to prevent the display or further processing of these weight values which are outside the permissible limits, the output signals of circuits 28a, 28b—i.e. the control currents of electromagnet 26—are fed to two identical amplifiers 40, 41 which in turn feed a NAND-gate 42. A ONE at its output signal—which allows for display and further processing of the weight—is possible only if neither of circuits 28a, 28b generates an output voltage, i.e. if electromagnet 26 is not excited.

Figure 6:
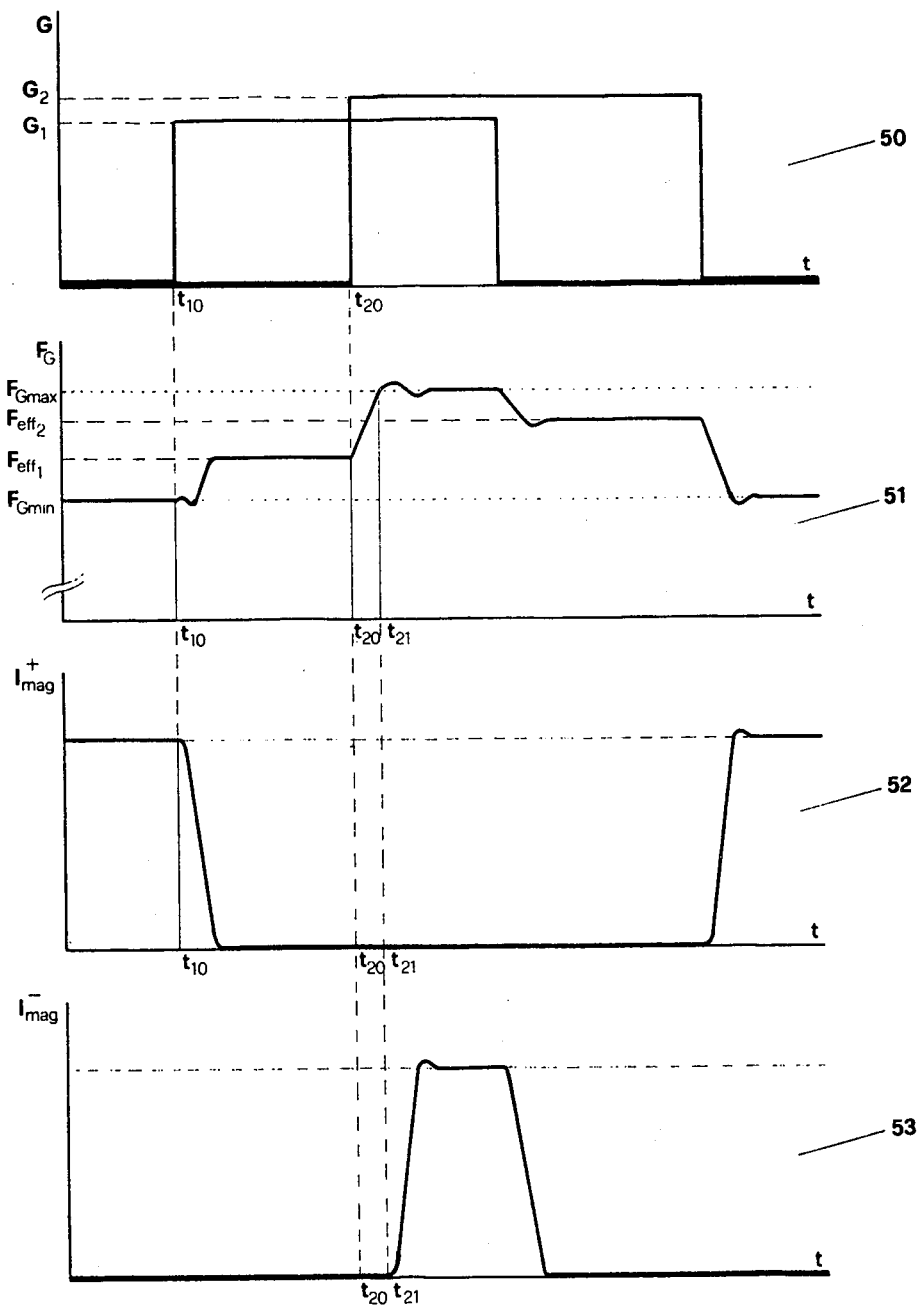

The behaviour of the scale according to FIG. 5 is shown in FIG. 6. Diagrams 50, 51, 52, 53 show the variations in time of forces and currents: diagram 50 shows the action of a first weight $G_1$ on platform 6 and that of a second weight $G_2$ before weight $G_1$ is taken off. In the time period during which both weights $G_1$, $G_2$ act upon platform 6 it is loaded by $$G_{tot} = G_1 + G_2$$

These weights $G_1$, $G_2$ are taken off in the order in which they are put on platform 6. When the latter is empty, cell 7 is under the effect of a force $F_{Gmin}$ generated by electromagnet 26 fed by the control current generated by circuit 28a. At time $t_{10}$ weight $G_1$ is put on platform 6 and control current $I_{mag}$—diagram 52 shows it—begins to decrease to zero. At the same time $F_G$ starts to increase exponentially, as diagram 51 shows, until it reaches value $F_{eff1}$ corresponding to the measuring force representing weight $G_1$. At time $t_{20}$ weight $G_2$ is also put on platform 6. A new exponential increase of $F_G$ starts from $F_{eff1}$ which should reach $F_G = F_{eff1} + F_{eff2}$. But at time $t_{21}$ $F_G$ exceeds level $F_{Gmax}$, as a consequence circuit 28b is triggered and generates control current $I_{mag}^-$ which controls electromagnet 26 in reverse direction so that it generates a force which relieves load support 5 so that only force $F_{Gmax}$ acts upon cell 7. Diagram 53 shows control current $I_{mag}^{31}$. When weight $G_1$ is taken off platform 6, current $I_{mag}^-$ decreases until zero, force $F_G$ decreases exponentially from $F_{Gmax}$ to $F_{eff2}$. As now $I_{mag}^+$ and $I_{mag}^-$ are zero, NAND-gate 42 allows the weight measured to be displayed. When weight $G_2$ is taken off platform 6, current $I_{mag}^+$ increases again and cell 7 is loaded with force $F_{Gmin}$.

The variations of force acting upon load support 5 are kept within the limits corresponding to the measuring forces $F_{Gmax}$ and $F_{Gmin}$, so that the exponential increases and decreases of the forces corresponding to the weights to be measured are very short. The mechanical and scale-dependent waiting time until the measuring force is stabilized on the value $F_{eff}$ practically disappear, so that this scale is suitable for speedy weighing operations. The scale according to FIG. 5 is particularly suitable for applications in which the goods to be weighed are thrown on platform 6 provoking corresponding peak loading of load support 5. In both embodiments the load transmission channel is schematically represented by block 10.

I claim:

1. Method for manual or automatic weighing of objects of same nominal weight by means of a scale locked over its measuring system, having a computing device for establishing the weight of the objects to be weighed from the digital output signals of mechanical-electrical converters, characterized in that if the load on the measuring system is lower or higher than pre-determined limits of the load corresponding to said nominal weight, an electromagnetically generated transitory force acts upon the load support of the scale and prevents overshooting of said pre-determined load limits, said transitory force being removed when the load on the measuring system is within the pre-determined limits.

2. Method according to claim 1, characterized in that a difference frequency is formed from the reference frequency and the measuring frequency, in that two control frequencies proportional to the reference frequency are formed, in that the true time integral of the voltage difference of the difference frequency and of one of the control frequencies is formed, amplified and fed to an electromagnet where it generates a downward directed compensation force, in that the true time integral of the voltage difference of the difference frequency and the other control frequency is formed, amplified in a second current amplifier and fed to said electromagnet where it generates an upwards directed compensation force.

3. Method according to claim 1, characterized in that a control frequency is formed from the reference frequency, in that the true time integral of the voltage difference is formed, amplified in a current amplifier and fed to an electromagnet where it generates a downwards directed compensation force.

4. A scale locked over its measuring system having a computing device for establishing the weight of the goods to be weighed from the digital output signals of mechanical-electrical converters, characterized by a mixer for forming the difference frequency from a measuring frequency and a reference frequency, by at least one control frequency generator generating a control frequency proportional to the reference frequency, at least one circuitry with an RS-flip-flop and a first amplifier forming a true difference integrator, said RS-flip-flop being controlled by said control frequency and said difference frequency, the latter being also directly fed to said first amplifier, by at least one current amplifier for amplifying one of the output signals of said first amplifier, by an electromagnet with at least one winding and an armature fixed to the load support of the scale, said winding being connected to the output of said second amplifier and fed by it, whereby a force is applied by said electromagnet to said load when the load exceeds pre-determined limits, said force being removed in response to a load which is within said limits.

5. Scale according to claim 2, characterized by two control frequency generators generating two control frequencies proportional to the reference frequency, by two circuitries having each an RS-flip-flop and an amplifier forming a true difference integrator, each RS-flip-flop being controlled by one of the control frequencies and by the difference frequency, the latter being also fed to said amplifier, the polarity of the inputs of said amplifiers in each circuitry being inverted, by two current amplifiers amplifying the output signals of said first amplifier, by an electromagnet with two windings and one armature fixture to the load support of the scale, each winding being connected to one of the current amplifiers and fed by it.

* * * * *